Jan. 18, 1938.  F. A. FRITZSCH  2,105,914
POWER TRANSMISSION MECHANISM
Original Filed July 17, 1935   2 Sheets-Sheet 1
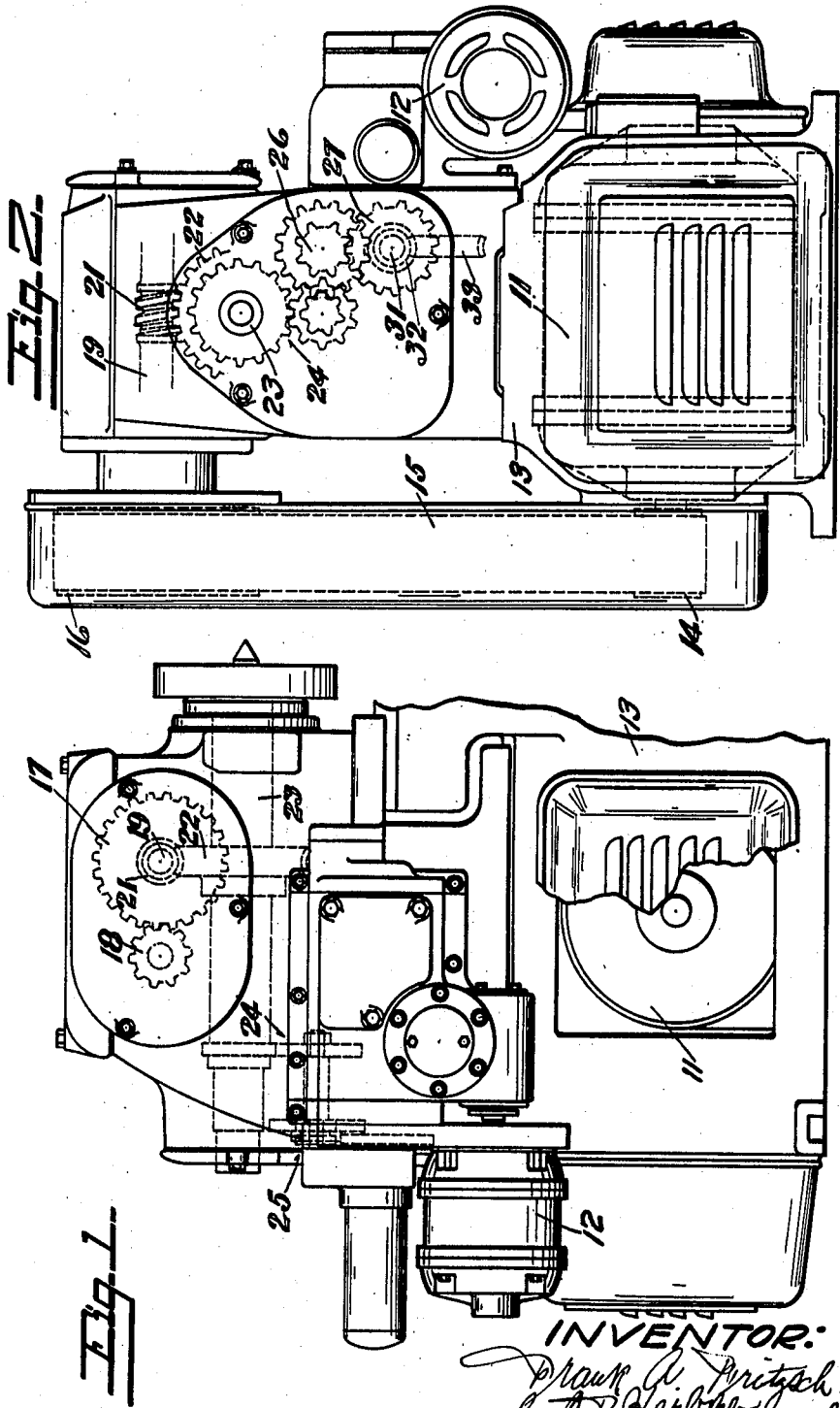

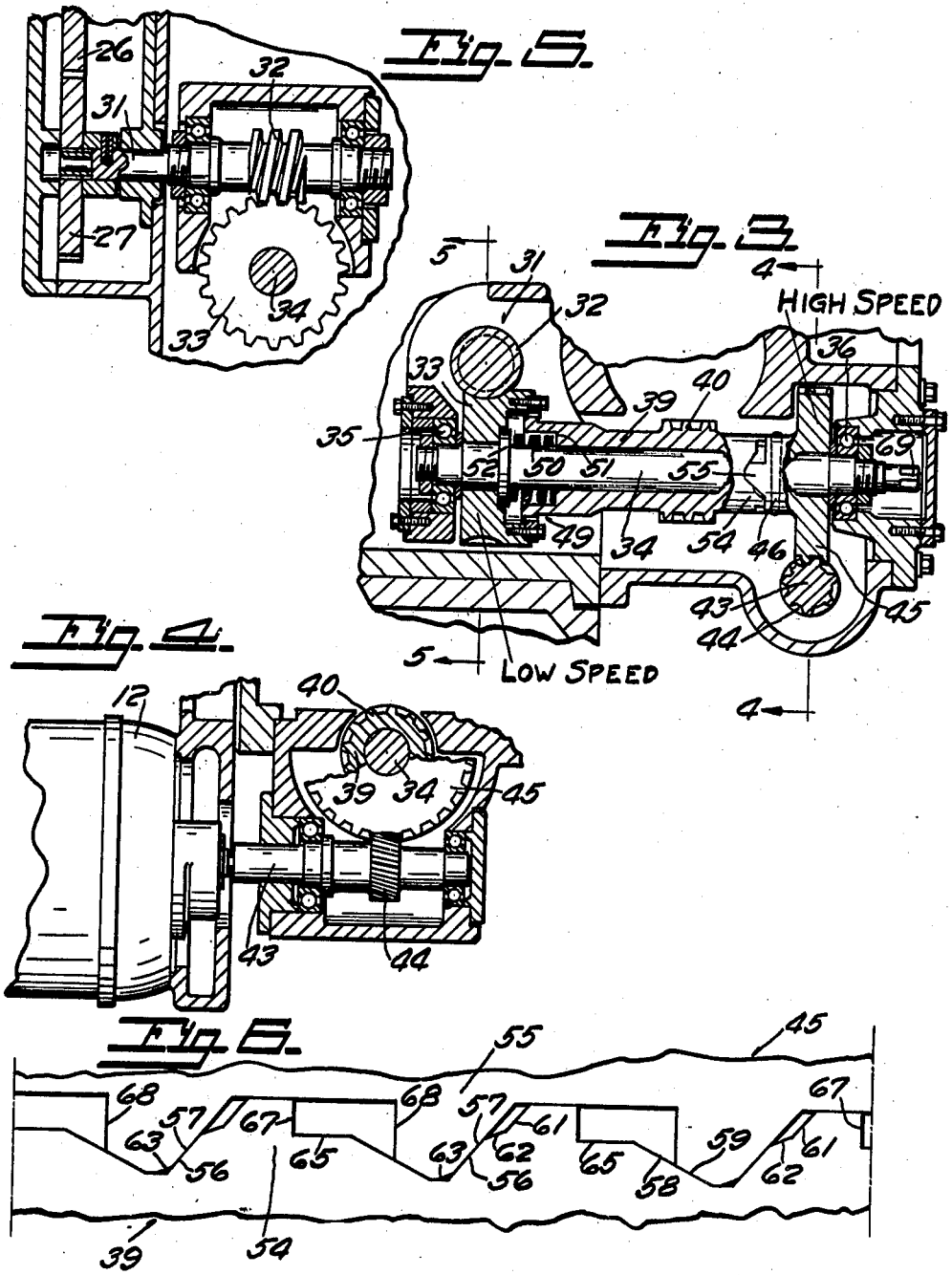

Patented Jan. 18, 1938

2,105,914

UNITED STATES PATENT OFFICE 2,105,914

POWER TRANSMISSION MECHANISM

Frank A. Fritzsch, Cincinnati, Ohio

Original application July 17, 1935, Serial No. 31,855. Divided and this application May 7, 1936, Serial No. 78,438

5 Claims. (Cl. 74—389)

This application is a division of my copending application for United States patent on improvement in lathes, Serial No. 31,855, filed July 17, 1935, and my invention is an improvement on the invention shown, described and claimed in Letters Patent of the United States No. 2,029,094, granted January 28, 1936, on the application of Charles B. DeVlieg and Nels S. Lundberg, for patent on improvement in power transmission mechanism.

In the device of the patent referred to, the clutch is in practice immediately and automatically reengaged upon cessation of rotation of the relatively high speed train, so that no definite termination of a cycle of operations can be assured, nor can the clutch be held in disengaged relation after stoppage of a cycle of operations until the beginning of the next cycle of operations.

It is the object of my invention to provide new and improved power transmission mechanism wherein a plurality of transmitting means of different speeds are arranged for operative connection with a transmitting member in such manner that one of said transmitting means influences another of said transmitting means to disconnect its transmitting connection, and is so formed as to maintain said other of said transmitting means in such disconnected relation at the cessation of operation of said one of said transmitting means; further, to provide means whereby to reconnect said transmitting connection by opposite operation of said one of said transmitting means; and, further, to provide means for manually operating a portion of said one of said transmitting means for manual adjustment.

My invention consists in providing novel means for accomplishing such objects.

My invention consists, further, in providing a driven member and a plurality of driving means therefor, one of which is preponderant upon the driven member, and is arranged to react upon the other of said driving means, and in providing a holding means for said preponderant driving means to maintain such reacted relation of the other of said driving means upon cessation of operation of such preponderant driving means; further, in making such one of said driving means reversible and in maintaining such reacted relation until reversal of said reversible driving means; and, further, in providing manual operating means effective in the train of such preponderant driving means to manually operate or move said driven member for adjusting the same or operated parts connected therewith.

I have illustrated my invention in association with portions of a lathe shown and described in my aforesaid copending application. This is an exemplification of one of the uses to which my invention may be applied. My invention is applicable in other relations, in other machines, and for other purposes. It is applicable primarily, however, in various kinds of cutting machinery, such as metal working machinery for cutting metal and similar or substitute materials, in which there is a rotary and lengthwise movement between the work and the tool, and is particularly applicable in such machinery in which the operations are performed in cycles. My invention provides definite means whereby the operations between the work and the tool are caused to definitely cease at the end of each cycle, and to be definitely stopped until the beginning of the next cycle.

I have exemplified the sources of power in my improved mechanism as electric motors, one or both of which may be reversible, transmitting respectively a relatively lower speed and a relatively higher speed, and power interrupting means in the train for the lower speed transmission which are acted on by an element in the train for higher speed transmission, the latter being so acted on as to remain in power interrupting relation upon cessation of operation of the electric motor for higher speed transmission, whereby to maintain interruption in the power connection of the train for lower speed transmission upon such cessation, and to maintain such interruption until reversal of said electric motor for transmitting relatively higher speed.

I prefer that the electric motor for relatively higher speed transmission shall be reversible. Such maintenance of interruption in the power connection of the train for lower speed transmission upon cessation of operation of the electric motor for higher speed transmission in one direction is especially useful at the termination of a cycle of operations. This interruption may be continuous until the electric motor for relatively higher speed transmission is again operated in reverse direction, which is especially useful when it is desired to initiate a new cycle of operations. Definite limits for the automatic termination of one cycle of operations and the beginning of the next cycle of operations are thereby assured.

The invention will be further readily understood from the following description and claims, and from the drawings, in which latter:

Fig. 1 is a front elevation of an exemplifying mounting of my improved device, partly broken away.

Fig. 2 is an end view of the same.

Fig. 3 is an axial sectional view of my improved device, partly broken away, and partly in side elevation, and having indicia of speeds thereon.

Fig. 4 is a cross-section of the same, taken on the line 4—4 of Fig. 3, and partly broken away.

Fig. 5 is a cross-section of the same, taken on the line 5—5 of Fig. 3, partly broken away; and, Fig. 6 is a developed plan view of the driving cams in the relatively high speed transmission.

I have exemplified two sources of power, one being an electric motor 11 for low speed transmission, which may be a reversible motor, and the other being an electric motor 12 for high speed transmission, which is instanced as a reversible motor. These electric motors may be suitably placed with relation to the operated parts.

In the present exemplification the electric motor 11 for low speed transmission is mounted in the frame 13, the rotor thereof having a pulley 14 fixed thereon, a belt 15 being received loopwise about this pulley and a pulley 16 fixed to a crossshaft journaled in the frame, and connected by suitable gearing, including change gears 17, 18, with a further cross-shaft 19 journaled in the frame.

The cross-shaft 19 has a worm 21 fixed thereon, which meshes with a worm wheel 22 fixed to the work supporting spindle 23 for rotating the same and the work, in the present exemplification.

Suitable gearings, shown generally at 24, 25, and including pick-off change gears 26, 27, are located between the spindle and a driving shaft 31, journaled in the frame.

The shafts and gearing thus far described may be of any suitable arrangement, and are herein shown as an example as they are disclosed in my aforesaid copending application.

The shaft 31 has a worm 32 fixed thereon, which meshes with a worm wheel 33, rotating loosely on a shaft 34, journaled in bearings 35, 36 in the frame.

A longitudinally movable transmitting member, shown as a sleeve 39, is on this shaft and has a transmitting element thereon, shown as a spiral gear 40, which transmits motion to a suitable actuated element, as a tool support in a lathe, for imparting feeding movements and quick traverse movements in reverse directions to the same relative to the rotating work supported by the spindle 23, if my improved device be employed in a lathe, as more particularly shown and described in my aforesaid copending application.

The parts operated by the sleeve 39 form no part of the present invention, the same having been shown, described and claimed in my aforesaid copending application.

The electric motor 12 for high speed transmission is suitably secured to the frame. This motor is preferably a reversible motor. The rotor of this motor is secured to a shaft 43, journaled in the frame and having a spiral pinion 44 fast thereon, which meshes with a spiral gear 45 fixed as by a pin 46 to the shaft 34.

There is a clutch 49 between the gear 33 and the sleeve 39, which sleeve is longitudinally movable lengthwise of the shaft 34. This clutch is shown as comprising internal teeth on the gear 33 and outer peripheral teeth on the slidable sleeve. Lengthwise sliding of the sleeve in one direction disengages the clutch, and lengthwise sliding of the sleeve in the opposite direction engages the clutch. A spring 50 in a socket 51 of the lengthwise movable sleeve, between a flange 52 on the shaft 34 and the bottom of said socket, tends normally to engage said clutch.

Automatic releasing means are provided for the clutch under the influence of the electric motor for high speed transmission. The automatic releasing means are actuated by a preponderance of motion imparted by the electric motor 12 for high speed transmission over the motion imparted by the electric motor 11 for slow speed transmission. These releasing means are shown as comprising coacting cam teeth 54, 55, respectively on proximate ends of the lengthwise movable sleeve 39 and the hub of the gear 45, having coacting inclined engaging or cam faces 56, 57 and 58, 59 between them. The cam faces 58, 59 are shown as having less pitch than the cam faces 56, 57.

When motion is transmitted solely from the motor 11 through the clutch and longitudinally movable sleeve, the motor 12 for high speed transmission is inactive, its rotor being rotated idly by means of the cam teeth and the gears 44, 45, there being no lengthwise movement of the sleeve 39 to disengage the clutch.

When, however, motion is transmitted from the motor 12 for high speed transmission, positive rotation is imparted to the gear 45 and the shaft 34, in either direction, which causes rotation of the cam teeth with the gear 45 either at greater speed than the speed of rotation which would be transmitted to the sleeve 39 by the low speed train, or reverse to said last-named rotation, resulting in angular movement between the respective cam teeth, and between the shaft 34 and the sleeve 39, with the result that axial or lengthwise movement is imparted to the sleeve 39 by the climbing between the cams, thereby disengaging the clutch 49 against the pressure of the spring 50, and rotating the sleeve 39 at the speed imparted by the motor 12 in either direction and unqualified by the low speed train of gearing operated by the motor 11.

There is a slight offset 61 in the engaging face 56 of each of the cam teeth 54. These engaging faces act when the motor for high speed transmission is rotating in one direction, instanced as a forward direction in a cycle of movements, in which movement, for example, the gears 33, 45, are driven respectively by the motor 11 and the motor 12, and are rotating in the same direction, the gear 45, however, rotating at greater speed than the gear 33, for instance, in a forward quick traverse movement between the tool and the work. During such rotations of the gears the engaging faces 56, 57 act as cams for disengaging the clutch 49, and the ends of the teeth on the gear 45 rest in the offsets 61.

These offsets have inclined bottoms 62 which coact with the rounded corners 63 of the teeth 55, to form releasable shoulders which coact to aid in holding the clutch 49 in disengaged relation only so long as there is preponderant driving force applied by the teeth 55. As soon, however, as such preponderant driving force is removed, as by cessation of rotation of the gear 45, or otherwise, slippage takes place between said shoulders, and the driving teeth 54, 55 are fully reengaged by the action of the spring 50.

The longitudinal movement of the sleeve 39 in disengaging direction is limited by engagement of its clutch end with the flange 52, in which relation the shoulders 62, 63 are in line with each other in axial direction for aiding in holding the clutch in unclutched relation, only so long as positive preponderant driving in one direction is imparted by the high speed transmission to the gear 45. These shoulders also hold the teeth of the clutch on the sleeve out of engagement with the clutch teeth on the gear 33 to prevent chattering between said teeth during such preponderant driving in one direction.

As soon, however, as the motor for high speed transmission is deenergized and the gear 45 ceases to be rotated thereby, the end walls of these offsets 61 which are camlike structures, are released from the teeth in engagement therewith for reverse lengthwise movement of the sleeve 39 and immediate reengagement of the clutch 49 by the action of the spring 50, as for feeding movement between the tool and the work in the cycle of operations, it being assumed that the motor 11 is operating in corresponding direction.

When the electric motor 12 for high speed power transmission is rotated in reverse direction for reverse high speed power transmission, an opposite rotative relation between the coacting cam teeth takes place for again moving the sleeve 39 endwise and disengaging the clutch 49, reverse rotation between the gear 45 and the gear 33 taking place. Consequent reverse high speed power transmission, which may be instanced as reverse quick traverse movement between the tool and the work in the cycle of movements, takes place, at the end of which it is desired that movement between the driven parts, namely the tool and the work in the example, shall cease, the cycle having been completed.

For insuring such cessation of movement, means are provided to prevent reengagement of the clutch 49. Such means are exemplified as latching or arresting means, as by providing the opposite engaging face 58 of each of the cam teeth 54 with a resting face or land 65, with which the ends of the teeth 55 coact when angular movement between the gear 45 and the sleeve 39 takes place in such opposite direction by preponderance of motion of the motor 12. The land is sufficiently wide to prevent retraction of the sleeve by the spring 50, and forms a latch for the sleeve. During such relation of the parts the clutch end of the sleeve 39 is preferably in engagement with the flange 52.

The respective teeth 54, 55 are provided with driving faces 67, 68 which are in engagement with each other to form driving contact between the gear 45 and the sleeve 39 when such coaction between the lands 65 and the ends of the teeth 55 has taken place by such angular movement between the gear 45 and the sleeve 39, caused by such preponderance of motion of the motor 12 rotated in said reverse direction. The lands are shown as extending at right angles to their axis of rotation and the driving faces 67, 68 as parallel to said axis. The lands are shown on one of the series of teeth and the driving faces are shown on both the series of teeth.

The latch remains effective to maintain the sleeve 39 in axially moved relation upon cessation of operation of the motor 12, which represents the termination of the cycle of operations in the present exemplification. This relation of parts remains effective until the motor 12 for high speed transmission is again operated in forward direction, for example, for initiation of the next following cycle of operations.

The worm 32 and the worm wheel 33 meshing therewith form resistance or anchor members against rotation from the sleeve 39, so that differential rotation imparted to said sleeve by the gear 45 and the cam mechanism between it and the sleeve 39 results in endwise movement of the sleeve 39 for disengaging the clutch 49 and placing the sleeve 39 under the rotative influence of the gear 45.

When the electric motor for high speed power transmission is deenergized while rotating in such reverse direction, the land is effective to prevent the coacting clutch elements from reengaging, thereby stopping all relative movements between the operative parts, instanced as the tool and the work, and determining the end of the cycle of operations.

The terms one direction, opposite direction, forward and reverse, are arbitrarily selected in explanation of the instanced cycle, and are intended to be merely relative.

The shaft 34 is provided with a manually operated portion, shown as a polygonal end 69, for receiving a suitable wrench, employed in machine setting operations. Manual rotation of the shaft 34 in either direction, it being assumed that both electric motors are deenergized, causes lengthwise movement of the sleeve 39 for disengaging the clutch 49, and imparts rotary motion to the sleeve 39 in either direction, and causes desired manual adjustment of the parts with which the sleeve 39 has operative connection, such parts being definitely operatively connected with said sleeve for power operation after such manual adjustments have been made.

In my improved device the rotors of the electric motors are maintained in mechanical connection with operating parts of my improved device, and the initiations and cessations of transmission by either or both motors may be electrically controlled, manually or automatically, from positions remote from the operating parts of the mechanism, without cumbersome mechanical transmission agencies, and the parts may be placed in definite relation for termination of the operations at the end of the cycle, and, further, the driving parts for high speed power transmission are so related at the end of the cycle that retractive movement between the parts is prevented for holding the slow speed train in interrupted relation until the next cycle is initiated by reversal of movement in the high speed train.

The respective electric motors may be energized and deenergized respectively for forward and for reverse rotations by suitable electric switches suitably operated. The operation of the switches between the steps in the cycle and at the termination of the cycle may be suitably automatically operated for opening or closing the same by suitable devices operating in association with the operated parts of the machine at the beginnings or ends of the steps of the cycles for automatically controlling the moments of beginnings and ends of said steps and their durations, such parts being shown, described and claimed in my aforesaid copending application.

During the time that the motor 12 for high speed power transmission is deenergized, the cam teeth 54, 55 are still in high speed power transmitting position but effect merely idle rotation of the rotor of the electric motor 12, upon operation of the electric motor 11, which is not objectionable as it offers little resistance and is not a perceptible factor in the transmission of power by the other of said motors. The train for high speed power transmission remains, however, in connective relation, so that all that need be done for placing the driven member under high speed transmission influence is to energize the electric motor 12 for high speed transmission, whereupon the mechanism is placed under such influence of such motor, this motor overrunning in either direction of rotation of the gear 45 relative to the gear 33 and automatically effecting the changes in the transmissions hereinbefore described.

While I have described my improved device in connection with metal working machinery, it is apparent that it may be applied in other relations where it is desired to transmit power by means such as herein exemplified.

While the initial driving means are exemplified as electric motors, the drives of my improved device may be mechanical, and other changes may be made in the exemplification herein shown and described, without departing from the spirit of my invention as contained in the accompanying claims.

I do not herein claim the parts nor the relations of parts herein shown or described as acted on by the mechanism herein claimed, having shown, described and claimed the same in my aforesaid copending application.

I claim:

1. In a power transmission mechanism employing a driven member, and a plurality of drive members having drive connections with said driven member including an anchor member in one of said drive connections reacted upon by another of said drive connections, with said other of said drive connections rotatable in either direction, and also including automatic disconnecting means interrupting said one of said drive connections upon such reaction, the combination of a means automatically holding said disconnecting means in disconnecting relation at the termination of rotation in one direction of said other of said drive connections until reversal of direction of rotation of said other of said drive connections.

2. In power transmission mechanism embracing a shaft, a sleeve about said shaft, a relatively slow speed driving member and a reversible relatively high speed driving member at the respective ends of said sleeve, and a normally connected releasable driving connection between said relatively slow speed driving member and said sleeve, the combination of oppositely presented driving means including oppositely presented cam means between said reversible relatively high speed driving member and said sleeve for angular and axial movement therebetween for releasing said releasable driving connection, and a latch for said driving means so constructed as to be moved into latching relation by operation of said reversible relatively high speed driving member in one direction and maintained in such latching relation upon cessation of such rotation in such one direction and automatically releasable by operation of said reversible relatively high speed driving member in reverse direction.

3. In a power transmission mechanism, the combination of a driven member, a relatively slow speed power train including a releasable driving connection with said driven member, a relatively high speed power train including a reversible electric motor and a driving connection with said driven member provided with oppositely presented means having operative connections with said releasable driving connection to release the same by reverse operations of said reversible electric motor and upon cessation of operation thereof in one direction to maintain such release relation, and manual means for operating said relatively high speed power train.

4. In power transmitting mechanism, the combination of a shaft, a sleeve thereabout, a relatively low speed gear rotatively loose with relation to said shaft about the axis of rotation of said shaft at one end of said sleeve, a normally engageable releasable clutch between said gear and said sleeve, a reversible relatively high speed gear fixed to said shaft at the other end of said sleeve so that said last-named gear and said shaft rotate together, a shifting connection between said last-named gear and said sleeve to shift said sleeve endwise for engaged relation and release relation of said clutch, and a transmitting gear on said sleeve, said shifting connection including holding means to hold said clutch in disengaged relation upon cessation of rotation of said relatively high speed gear in one direction of rotation until reversal of direction of rotation of said relatively high speed gear.

5. In power transmitting mechanism, the combination of a shaft, a power transmitting sleeve thereabout, a relatively low speed gear rotatively loose with relation to said shaft about the axis of rotation of said shaft at one end of said sleeve, a normally engageable releasable clutch between said gear and said sleeve, a reversible relatively high speed gear fixed to said shaft at the other end of said sleeve, and a shifting connection between said last-named gear and said sleeve constructed so that said shaft and said sleeve rotate together and said sleeve is shifted endwise for engaged relation and release relation of said clutch, said shifting connection including a holding means to hold said clutch in disengaged relation upon cessation of rotation of said relatively high speed gear in one direction of rotation until reversal of direction of rotation of said relatively high speed gear.

FRANK A. FRITZSCH.